3,188,365
THERMOPLASTIC COMPOSITION COMPRISING A RESINOUS STYRENE-ACRYLONITRILE-METHACRYLIC ACID TERPOLYMER AND A RUBBERY BUTADIENE - ACRYLONITRILE-METHACRYLIC ACID TERPOLYMER
Stephen V. Slovenkai, Pompton Lakes, N.J., assignor to United States Rubber Company, New York, N.Y., a corporation of New Jersey
No Drawing. Filed July 3, 1961, Ser. No. 121,325
2 Claims. (Cl. 260—893)

This invention relates to a thermoplastic mixture comprising an intimate blend of a major proportion of a resinous copolymer of styrene, acrylonitrile, and methacrylic acid and a minor proportion of a rubbery copolymer of butadiene, acrylonitrile, and methacrylic acid. The novel blends are characterized by hardness, stiffness, and high impact resistance at room temperature, combined with a high heat-distortion temperature relative to that of otherwise similar blends not containing said acid in the resinous component and the rubbery component. Obviously such properties are highly desirable for the fabrication of many rigid plastic articles.

To produce my novel thermoplastic compositions I blend (A) a hard, stiff, resinous copolymer of styrene, acrylonitrile, and methacrylic acid, said resinous copolymer containing copolymerized therein about 55%, i.e., from 50% to 60% of styrene, about 25%, i.e., from 20% to 30% of acrylonitrile, and about 20%, i.e., from 15% to 25% of said acid, with (B) a rubbery copolymer of butadiene, acrylonitrile and methacrylic acid, said rubbery copolymer containing copolymerized therein about 65%, i.e., from 60% to 70% of butadiene, from 20% to 30% of acrylonitrile, and about 5%, i.e., from 3% to 10% of methacrylic acid. (All compositional percentages and ratios herein are by weight.)

The resinous copolymer employed in the invention may be prepared by any of the well-known conventional polymerization methods, such as emulsion polymerization, solution polymerization, bulk or oil phase polymerization, and bead or suspension polymerization. These methods require no detailed description here, being well-known in the art. Since an acid is present in making both the resin and the rubber, the emulsifier, when emulsion polymerization is used, should be one which gives stable emulsions in the presence of acid, such being well-known in the art.

The techniques for making the rubbery component of my compositions are likewise well-known, being similar to those used for making the resinous component.

An example of the preparation of a carboxylic resin for use in my invention is as follows:

| | |
|---|---:|
| Water | 200 |
| Sodium lauryl sulfate | 5 |
| Potassium persulfate | 0.5 |
| t-Dodecyl mercaptan | 0.05 |
| Sodium pyrophosphate | 0.3 |
| Styrene | 55 |
| Acrylonitrile | 25 |
| Methacrylic acid | 20 |
| Temperature °C | 50 |
| Conversion percent | 100 |

An example of the preparation of a carboxylic rubbery copolymer for use in my invention is as follows:

| | |
|---|---:|
| Water | 180 |
| Sodium lauryl sulfate | 5 |
| Potassium persulfate | 0.3 |
| Tertiary mercaptans [1] | 0.8 |
| Butadiene | 65 |
| Acrylonitrile | 30 |
| Methacrylic acid | 5 |
| Ethylene diamine tetraacetic acid, disodium salt | 0.5 |
| Hydroquinone (shortstop) | 0.2 |
| Amine antioxidant | 1 |
| Temperature °F | 50 |
| Conversion percent | 70–75 |

[1] A commercial mixture consisting nominally of 60% of t-dodecyl mercaptan, and 20% each of t-tetradecyl and t-hexadecyl mercaptans.

In the case of both the resin and the rubber preparation, the polymers are precipitated, dried, and worked up in the usual way.

Compounded blends of a resin and a rubber according to my invention may be prepared as follows: The resin is first heated on steam-heated mill rolls, then the rubber component is added and the mixture is milled until well blended. The preferred proportions of the components are from 70 to 75% of the carboxylic resin and correspondingly from 30 to 25% of the carboxylic rubber component. Conventional antioxidants, stabilizers, fillers, pigments, and other common ingredients may be added as desired.

Examples of specific mixtures prepared according to my invention, and physical properties of the same, are shown in the following table.

| | | |
|---|---:|---:|
| Resin prepared as above | 75 | 70 |
| Rubber prepared as above | 25 | 30 |
| Phenolic antioxidant | 1 | 1 |
| Calcium stearate (processing aid) | 0.5 | 0.5 |
| Heat-distortion temperature, °C | 98.5 | 99 |
| Torsion modulus, p.s.i.×10$^{-3}$ | 289 | 198 |
| Rockwell R hardness | 106 | 80 |
| Tensile strength, p.s.i. | 4,980 | 3,460 |
| Elongation at break, percent | 8 | 14 |
| Izod impact, ft.-lbs. per inch of notch | 1.9 | 11.7 |

It is seen that the 75/25 resin-rubber blend has a moderately high impact strength, and that the 70/30 blend has an exceptionally high impact strength. The heat distortion temperatures are higher than those of comparable blends of resin and rubber containing no copolymerized acid therein.

While the examples above show mill mixing of the resin and the rubber, it is obvious that latex blending of the separately prepared polymers, followed by co-precipitation and drying in the well-known manner may be employed.

What I claim is:
1. A thermoplastic blend characterized by high impact strength and high heat-distortion temperature, comprising:
    (A) a major proportion of a resinous copolymer of styrene, acrylonitrile, and methacrylic acid, said resin containing copolymerized therein from 50% to 60% of styrene, from 20% to 30% of acrylonitrile, and from 15% to 25% of said acid, and
    (B) a minor proportion of a rubbery copolymer of butadiene, acrylonitrile, and methacrylic acid, said rubbery copolymer containing copolymerized therein from 60% to 70% of butadiene, from 20% to 30% of acrylonitrile, and from 3% to 10% of methacrylic acid.

2. A thermoplastic blend characterized by high impact strength and high heat-distortion temperature, comprising from 70 to 75% of a resinous copolymer of styrene, acrylonitrile, and methacrylic acid in the relative proportions 55/25/20, and correspondingly from 30 to 25% of a rubbery copolymer of butadiene, acrylonitrile, and methacrylic acid in the proportions 65/30/5.

References Cited by the Examiner

UNITED STATES PATENTS

| 2,880,189 | 3/59 | Miller et al. | 260—80.7 |
| 2,959,821 | 11/60 | Kolb | 260—29.7 |

FOREIGN PATENTS 589,755  12/59  Canada.

MURRAY TILLMAN, *Primary Examiner.*

LEON J. BERCOVITZ, *Examiner.*